UNITED STATES PATENT OFFICE.

ADOLF WINTHER, AUGUST LEOPOLD LASKA, AND ARTHUR ZITSCHER, OF OFFENBACH-ON-THE-MAIN, GERMANY, ASSIGNORS TO CORPORATION OF CHEMISCHE FABRIK GRIESHEIM, ELEKTRON, OF FRANKFORT-ON-THE-MAIN, GERMANY.

AZO DYES FOR LAKES.

1,034,853.      Specification of Letters Patent.      Patented Aug. 6, 1912.

No Drawing.      Application filed March 12, 1912. Serial No. 683,320.

*To all whom it may concern:*

Be it known that we, ADOLF WINTHER, AUGUST LEOPOLD LASKA, and ARTHUR ZITSCHER, chemists and doctors of philosophy, subjects of the German Emperor, and residents of Offenbach-on-the-Main, Grand Duchy of Hesse, Germany, with post-office addresses Obermainstrasse 161, Wilhelmsplatz 18, and Friedrichstrasse 31, respectively, have invented new and useful Improvements in Azo Dyes for Lakes, of which the following is a specification.

Our invention relates to the manufacture and production of new azo dyes which are especially adapted for the manufacture of pigment colors. These dyestuffs can be obtained by the combination of such diazo compounds of the benzene series, which contain at least one negative group, with the arylamids of the 2.3-oxynaphthoic acid.

The arylamids of the 2.3-oxynaphthoic acid can be easily obtained as described by Schöpff, *Ber. der Deutschen Chem. Gesellschaft*, vol. 25, page 2743. Besides the 2.3-oxynaphthoic anilid itself the substitution products thereof come also into consideration, which can be obtained, when substituting for anilin the substitution products thereof, as for instance the homologues and the chloro- and nitro-substitution products, by the reaction with 2.3-oxynaphthoic acid. The so obtained dyestuffs produce orange to Bordeaux lakes which are remarkable for their excellent fastness to oil and to light. We have found that the products substituted in the arylamidobody in ortho-position to the imido group gives more yellow shades than the corresponding para-substitution products.

The manufacture of the lakes can be carried out in a mineral acid solution, organic acid solution or in neutral or alkaline solution and the manufacture of dyestuffs and of lakes can be united of course in one operation.

The following examples will serve to illustrate the nature of our invention; parts being by weight:

Example I: 15.2 parts of para-nitro-ortho-toluidin ($CH_3 : NH_2 : NO_2 = 1 : 2 : 4$) are diazotized in usual manner and the diazo compound is allowed to flow while stirring well into an aqueous suspension of 27.6 parts of the anilid of 2.3-oxynaphthoic acid obtained by dissolving this body in diluted caustic soda lye and by precipitating it again with diluted acetic acid. The dyestuff separates in shape of brilliant red flakes. When the formation is completed, the dyestuff is filtered, washed with water until it shows neutral reaction and preferably used in the form of a paste. The dyestuff forms in dry shape a bluish red powder which is soluble in concenerated sulfuric acid with blue-red color.

Example II: 12.8 parts of meta-chloroanilin are dissolved in 28.5 parts of hydrochloric acid (20° Bé.) and 100 parts of water and diazotized after cooling with ice by means of 6.9 parts of sodium nitrite. The diazo solution is poured into a suspension of 31.3 parts of the ortho-chloroanilid of 2.3-oxynaphthoic acid, to which are added 20.4 parts of sodium acetate and which can be obtained by dissolving the ortho-chloroanilid of 2.3-oxynaphthoic acid with diluted caustic soda lye and by precipitating with diluted hydrochloric acid in presence of Turkey-red oil. After the combination is completed the precipitated dyestuff is filtered off and washed. It forms in dry shape a reddish orange powder and is soluble in concentrated sulfuric acid with bluish red color.

The structural formulæ of the dye as produced by the two specific examples is probably as follows:

Example I:

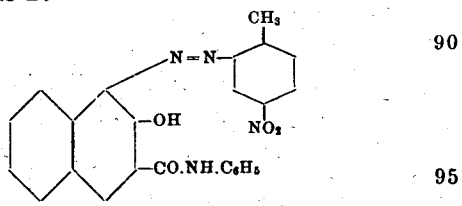

Example II:

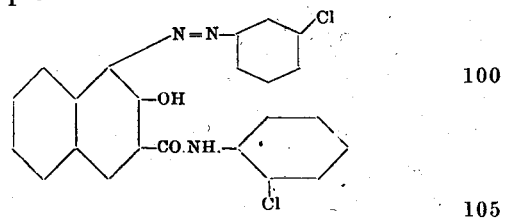

The following table gives some of the properties of the pigment colors obtained according to this invention:

| Colors prepared by the combination of diazotized— | With— | Gives pigment colors. |
|---|---|---|
| o-chloroanilin | The anilid of 2.3-oxynaphthoic acid. | Red. |
| m-chloroanilin | | Yellowish red. |
| p-chloroanilin | | Red. |
| 2.4-dichloroanilin | ....do | Red. |
| 2.5-dichloroanilin | | Red. |
| 3.4-dichloroanilin | | Red. |
| 2.5-dichloroanilin | The p-toluidid of 2.3-oxynaphthoic. | Red. |
| o-chloroanilin | The p-chloroanilid of 2.3 oxynaphthoic acid. | Red. |
| m-chloroanilin | | Red. |
| p-chloroanilin | | Red. |
| 2.5-dichloroanilin | | Red. |
| o-chloroanilin | The o-chloroanilid of 2.3-oxynaphthoic acid. | Reddish orange. |
| m-chloroanilin | | Orange. |
| p-chloroanilin | | Red. |
| 2.5-dichloroanilin | | Yellowish red. |
| o-chloroanilin | The 2.5-dichloroanilid of 2.3-oxynaphthoic acid. | Red. |
| m-chloroanilin | | Red. |
| 2.5-dichloroanilin | | Red. |
| m-chloroanilin | The p-anisidid of 2.3-oxynaphthoic acid. | Red. |
| m-chloroanilin | The beta-naphthalid of 2.3-oxynaphthoic acid. | Red. |
| p-chloro-o-toluidin | The anilid of 2.3-oxynaphthoic acid. | Red. |
| m-nitroanilin | ....do | Orange. |
| o-nitroanilin | ....do | Yellowish red. |
| p-nitro-o-toluidin | ....do | Bluish red. |
| Do | The p-toluidid of 2.3-oxynaphthoic acid. | Do. |
| Do | The p-chloroanilid of 2.3-oxynaphthoic acid. | Do. |
| Do | The o-chloroanilid of 2.3-oxynaphthoic acid. | Do. |
| Do | The m-chloroanilid of 2.3-oxynaphthoic acid. | Do. |
| Do | The 2.5-dichloroanilid of 2.3-oxynaphthoic acid. | Do. |
| Do | The m-nitroanilid of 2.3-oxynaphthoic acid. | Do. |
| Do | The p-anisidid of 2.3-oxynaphthoic acid. | Do. |
| m-nitro-p-toluidin | The anilid of 2.3-oxynaphthoic acid. | Bordeaux. |
| 5-nitro-2-anisidin | ....do | Do. |
| p-chloro-o-nitranilin | ....do | Red. |
| o-chloro-p-nitranilin | ....do | Do. |
| 2.4-dinitroanilin | ....do | Do. |

Now what we claim and desire to secure by Letters Patent is the following:

1. The process for the manufacture of new monoazo dyestuffs, especially adapted for preparing pigment colors, consisting in combining such diazo compounds of the benzene series, which contain at least one negative group, with the arylamids of the 2.3-oxynaphthoic acid.

2. As new articles the azo dyestuffs which can be obtained by combining such diazo compounds of the benzene series, which contain at least one negative group, with the arylamids of the 2.3-oxynaphthoic acid, which dyestuffs form in dry state brilliant reddish orange to bluish red powders entirely insoluble in water, soluble in concentrated sulfuric acid with very bluish red color, and yielding upon reduction with stannous chlorid and hydrochloric acid a substituted amin of the benzene series and an arylamid of the 1-amino-2-oxy-3-naphthoic acid; which dyestuffs can be easily transformed into color lakes of orange to Bordeaux tints.

In testimony, that we claim the foregoing as our invention, we have signed our names in presence of two witnesses, this 28th day of February 1912.

ADOLF WINTHER.
AUGUST LEOPOLD LASKA.
ARTHUR ZITSCHER.

Witnesses:
WILHELM WAWER,
PETER CONRAD.